United States Patent [19]
Tracy et al.

[11] Patent Number: 5,944,002
[45] Date of Patent: Aug. 31, 1999

[54] SELF-VENTING GROMMET FOR COIL-ON-PLUG

[75] Inventors: Lawrence P. Tracy; Jonathan L. Umsted; Norman L. Jones, all of Columbus; Bryan E. Hansome, Norman; Michael W. Alstrin, Indianapolis, all of Ind.

[73] Assignee: Cummins Engine Company, Inc., Columbus, Ind.

[21] Appl. No.: 09/061,648

[22] Filed: Apr. 17, 1998

[51] Int. Cl.[6] ........................................ H01T 13/06
[52] U.S. Cl. ..................... 123/635; 123/143 C; 277/596; 439/125
[58] Field of Search .......................... 123/143 C, 169 PA, 123/169 PH, 635; 439/125–130; 277/313, 594, 596, 600

[56] References Cited

U.S. PATENT DOCUMENTS

| | | | |
|---|---|---|---|
| 2,633,808 | 4/1953 | Webber | 417/555.2 |
| 5,170,767 | 12/1992 | Wada et al. | 123/633 |
| 5,382,170 | 1/1995 | Imanishi | 439/127 |
| 5,537,983 | 7/1996 | Nakajima | 123/169 PA X |
| 5,547,387 | 8/1996 | Kobayashi | 439/125 |
| 5,618,193 | 4/1997 | Nakajima et al. | 123/169 PA X |
| 5,628,298 | 5/1997 | Murata | 123/143 C X |

Primary Examiner—Tony M. Argenbright
Attorney, Agent, or Firm—Woodard, Emhardt, Naughton, Moriarty & McNett

[57] ABSTRACT

A vented, unitary sealing grommet for establishing a first liquid-tight interface between a ignition coil and a spark plug adapter tube and a second liquid-tight interface between the ignition coil and a valve cover includes a hollow main body portion having a substantially cylindrical shape with a longitudinal axis and including a pair of annular sealing ribs, a planar flange portion which is disposed within a geometric plane which is substantially perpendicular to the longitudinal axis, the main body portion being designed to fit between the ignition coil and the spark plug adapter tube such that the annular sealing ribs are compressed due to the interference fit. The planar flange portion is designed to fit between ignition coil and the valve cover. The vented capability is created in the sealing grommet by means of a pair of oppositely disposed vent channels defined by the inside surface of the main body portion and in cooperation therewith by means of a pair of oppositely disposed second vent channels defined by an upper surface of the planar flange portion, each vent channel defined by the main body portion is in flow communication with a corresponding vent channel defined by the upper surface. The main body portion includes two relief notches which serve to keep the vent channels in the main body portion open.

29 Claims, 4 Drawing Sheets

SELF-VENTING GROMMET FOR COIL-ON-PLUG

BACKGROUND OF THE INVENTION

The present invention relates in general to spark-ignited gaseous fuel engine technology and a sealing accessory for the ignition coil and valve cover interface. More specifically the present invention relates to the use of a grommet to seal the ignition coil-to-valve cover interface as well as sealing the area between the ignition coil and a spark plug adapter tube. In a related embodiment of the present invention, the grommet is designed with a unique vented design to safely release the internal air pressure which builds up in the spark plug adapter tube during engine operation.

Current engine technology, such as that associated with large, stationary gaseous fuel four-valve engines, may incorporate an ignition system which is typically described as a coil-on-plug or COP ignition system. In this type of engine and ignition system, as is believed to be well known to those of ordinary skill in the art, there is a spark plug, a spark plug adapter tube, an ignition coil, and a valve cover. FIG. 1 herein provides a cross sectional illustration of this ignition system and the primary components, all of which are believed to be known to one of ordinary skill in the art. In the interior space beneath the valve cover and around the spark plug adapter tube, there is lubricating oil which is jetted and splashed around during engine operation due to overhead lubrication. It is possible for this lubricating oil to flow or leak through the space between the spark plug adapter tube and the valve cover. If this occurs, it is possible for the oil to then back flow into the spark plug tube bore where it can cause ignition misfire and other service problems.

It may have been contemplated in the past to wedge an O-ring between the valve cover and the spark plug adapter tube in order to block the flow or leakage of oil, but this creates its own problems. Another option might have been the use of a flat face seal on the coil, but this also generates certain problems. For example, once the ignition coil is removed, there is nothing on the valve cover to use to pull on or leverage in order to remove the cover. With the cover and the tube in effect anchored together due to the wedged O-ring, removal of the cover is made quite difficult. Removal of the valve cover would be required periodically in order to adjust valve lash. Accordingly, this becomes an efficiency and an ease of servicing issue as well as a sealing issue. It is desired to prevent the flow of oil into critical operating areas and whatever style of O-ring or grommet may be used, it needs to be an effective liquid sealer. If there is no sealed interface once the coil is removed, then the various components are not, in effect, locked together by having a seal or an O-ring wedged between them. It would therefore be an improvement to the O-ring designs which may have been tried by others to find a way to eliminate any O-rings without sacrificing the desired sealing between the spark plug adapter tube and the valve cover and, if needed, the sealing between the ignition coil and the spark plug adapter tube.

There is a further concern to be addressed with virtually any type of sealing/O-ring arrangement for this engine application, even with the present invention, and this concerns the air pressure build up on the interior of the spark plug adapter tube due to the fixed volume of air which is trapped therein. This fixed volume of air is subjected to an elevated temperature during engine operation and accordingly the air is heated at a constant volume, generating a higher pressure. The tube interior volume is a sealed volume once the seals are installed for the prevention of oil leakage. Accordingly, there is initially a fixed mass of air inside the tube which is heated as the interior temperature rises. This heating of the fixed volume of air causes the interior air pressure to increase. Since large, stationary gaseous fuel engines of the type being discussed herein are typically serviced while still warm or hot, with only a brief cool down period, there is still an elevated interior pressure as the service technician begins working on the engine. As engine components are disassembled for servicing, specifically the ignition coil, there is a risk that the components used for sealing in order to prevent oil leakage will act like a cork on a champagne bottle. As the "cork" is dislodged, a loud "pop" sound is heard and this can be very unnerving to the service technician.

Engines of the type being discussed herein are relatively large and a step ladder or some type of elevated platform is normally used by the service technician in order to climb up and get in position. The loud "pop" sound comes as a shock to the service technician and there is a concern that this individual may be distracted and lose his balance on the step ladder. The built-up pressure in the tube may also be large enough to partially eject the coil, like the cork on a bottle, and this presents another concern. If the interior pressure could be relieved or gradually vented in some fashion before any components are disassembled, then the loud "pop" sound would be prevented and there would not be the same level of risk of components, such as the ignition coil, being partially ejected.

The present invention provides two improvements to the foregoing design problems and concerns. The first improvement relates to a way to eliminate any O-ring seals as previously discussed. The second improvement relates to a way to provide gradual venting of the interior volume. While each of these improvements are novel and unobvious individually, the present invention also contemplates the integration of both improvements into a single unitary component.

SUMMARY OF THE INVENTION

A unitary sealing grommet for establishing a first liquid-tight interface between a first component and a second component and a second liquid-tight interface between the first component and a third component according to one embodiment of the present invention comprises a hollow main body portion have a substantially cylindrical shape and a longitudinal axis and being constructed and arranged with a pair of annular sealing ribs, a substantially planar flange portion lying in a geometric plane which is substantially perpendicular to the longitudinal axis and the main body portion being constructed and arranged to fit between the first component and the second component such that the pair of annular sealing ribs are compressed due to an interference fit and the planar flange portion being constructed and arranged to fit between the first component and the third component.

One object of the present invention is to provide an improved unitary sealing grommet.

Related objects and advantages of the present invention will be apparent from the following description.

DESCRIPTION OF THE PREFERRED EMBODIMENT

Figure 1:
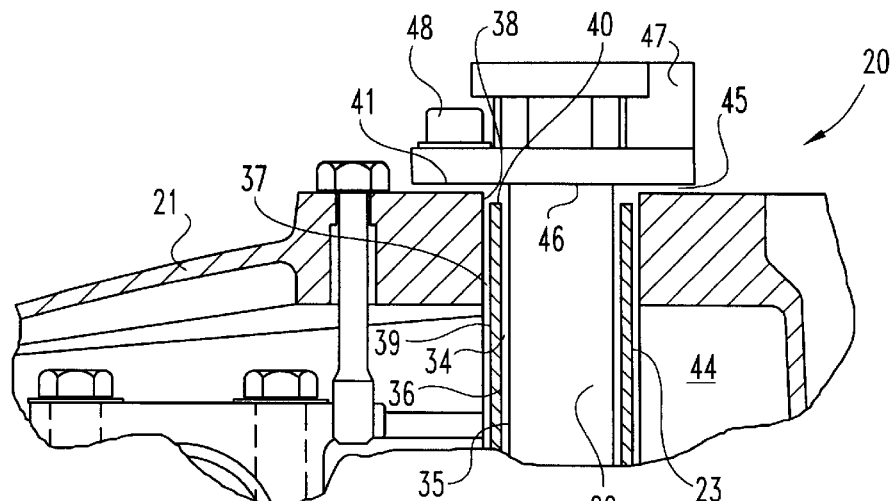
FIG. 1 is a partial, front elevational view of an engine which represents a suitable engine design for incorporation of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a stationary gas engine 20 which includes a valve cover 21, ignition coil 22, and spark plug adapter tube 23. As illustrated, there is an annular clearance space 34 disposed between the outer, cylindrical surface 35 of the ignition coil 22 and the inner, cylindrical surface 36 of the adapter tube 23. There is also an annular clearance space 37 disposed between valve cover opening 38 and the outer cylindrical surface 39 of the adapter tube 23. The upper free end 40 of the adapter tube 23 is spaced below the upper surface 41 of the valve cover 21. The adapter tube 23 is concentric with the cylindrical surface 35.

Figure 2:
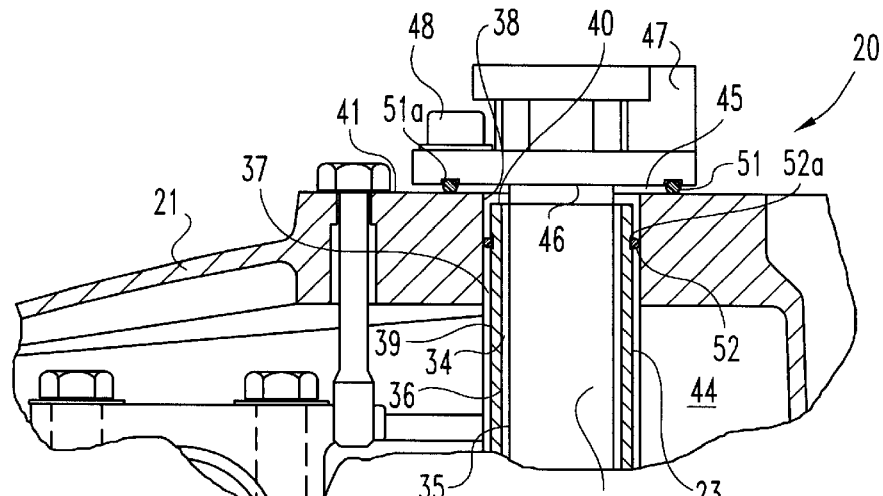
FIG. 2 is a partial, front elevational view of the FIG. 1 engine with O-rings added at possible sealing locations.

As discussed and explained in the Background, the interior volume 44 is subjected to overhead lubrication and there is jetted and splashed oil present which can flow through clearance space 37 and from there over end 40 and into clearance space 34. In order to prevent the leakage of oil into clearance space 34, the use of an annular O-ring seal is contemplated as illustrated in FIG. 2. Any leakage of oil that does not flow over end 40 may alternatively leak through the interface 45 between the upper surface 41 of the cover 21 and the underside surface 46 of the ignition coil head 47 which is securely attached by cap screws 48 to the cover 21. In order to prevent oil leakage through interface 45, the use of an O-ring, face seal, or gasket in clearance space 37 is contemplated (see FIG. 2).

With reference to FIG. 2, O-ring seal 51 and O-ring seal 52 have been added to the FIG. 1 illustration. O-ring seal 51 is positioned in interface 45 between the ignition coil head 47 and cover 21. A suitable O-ring channel 51a is machined into the underside surface 46 of head 47 to capture the O-ring seal 51. O-ring seal 52 is positioned in clearance space 37. A suitable O-ring channel 52a is machined into the outer wall of tube 23 to capture the O-ring seal 52. One disadvantage of this possible or contemplated solution to the oil leakage concern is the use of two separate components and importantly the need to machine some type of O-ring channel in one of the two facing surfaces in order to receive and capture the corresponding O-ring as would be known in the art as a necessary step for preferred O-ring usage. In the event the valve cover needs to be removed for the servicing of some portion of the engine, such as adjusting valve lash, it is important that the valve cover 21 be easily removable. There is nothing present on the valve cover to grasp in order to pull on in order to remove it. If the cover 21 is secured to the adapter tube 23 by means of a wedged (compressed) O-ring seal, then removal of the valve cover 21 is not particularly easy and accordingly servicing is not as easy.

Figure 3:
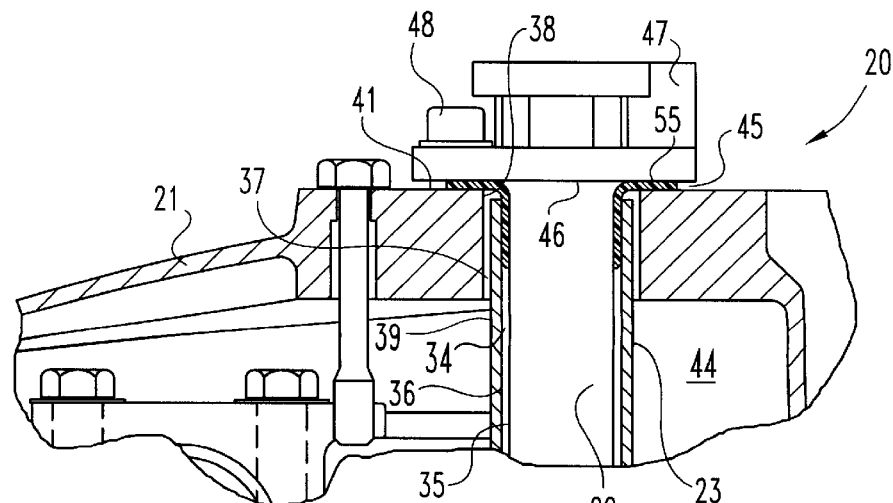
FIG. 3 is a partial, front elevational view of the FIG. 1 engine with the FIG. 2 O-rings replaced by a one-piece grommet.

With reference to FIG. 3, a first embodiment of the present invention is illustrated where the two O-ring seals 51 and 52 have been replaced by a one-piece (unitary) molded rubber grommet 55. There are actually two styles for grommet 55, a non-vented style, which is illustrated as grommet 55a in FIGS. 4–6, and a vented style of grommet, which is illustrated in FIGS. 7–12 as grommet 55b. Each grommet, 55a and 55b, includes a radial flange portion 56 and 57, respectively, positioned at interface 45 and an integral, generally cylindrical body portion 58 and 59, respectively, which is positioned in annular clearance space 34. Each grommet is constructed out of a suitable material and arranged dimensionally for its body portion 58, 59, to be compressed between outer surface 35 and inner surface 36 and for its flange 56, 57 to be compressed between underside surface 46 and upper surface 41. Compression of the elastomeric material used for each grommet 55a and 55b establishes a liquid-tight seal suitable to prevent the flow of lubricating oil through interface 45 and through annular clearance space 34. The compression of the flange portion 56, 57 is achieved by the tightening of cap screws 48, which tightening step draws ignition coil head 47 toward the upper surface 41 of valve cover 21.

Figure 4:
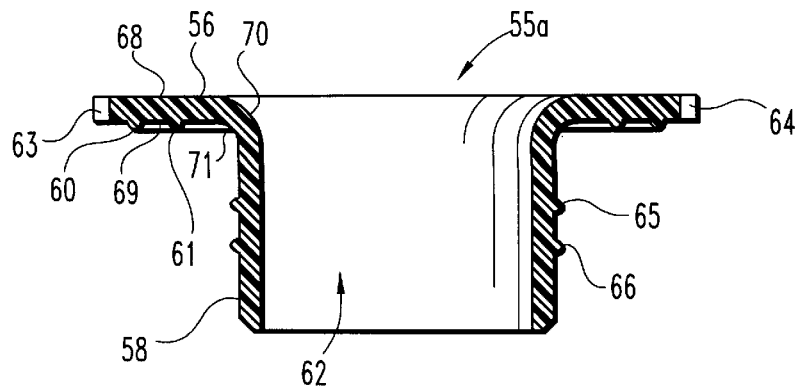
FIG. 4 is a front elevational view in full section of one grommet design suitable for use in the FIG. 1 engine.
Figure 5:
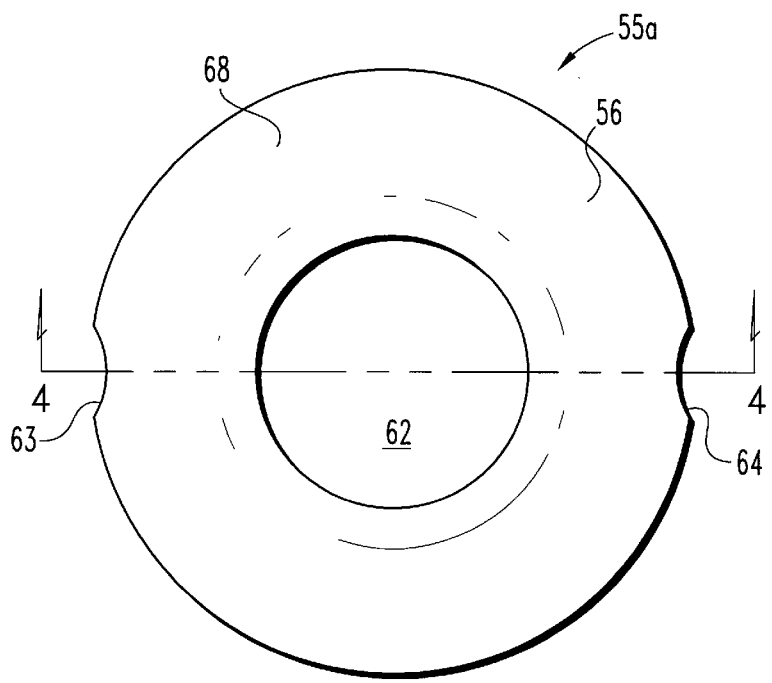
FIG. 5 is a top plan view of the FIG. 4 grommet.
Figure 6:
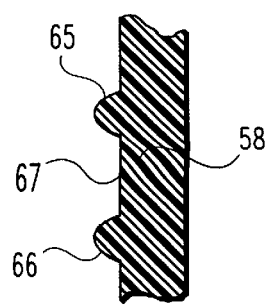
FIG. 6 is a partial, enlarged detail view of annular sealing ribs which comprise part of the FIG. 4 grommet.
Figure 7:
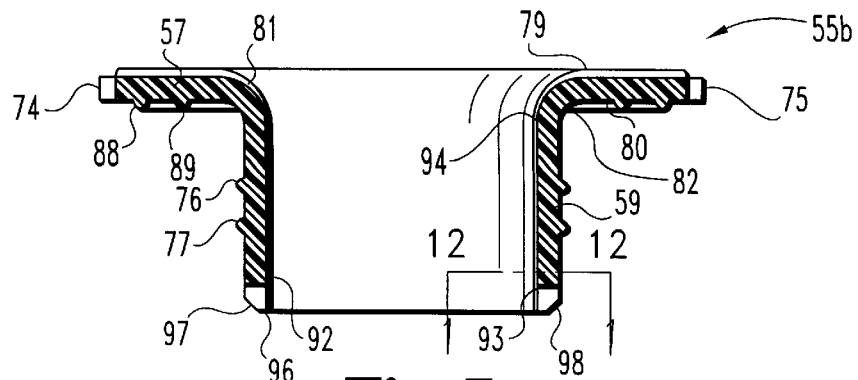
FIG. 7 is a front elevational view in full section of an alternative grommet design suitable for use in the FIG. 1 engine.
Figure 8:
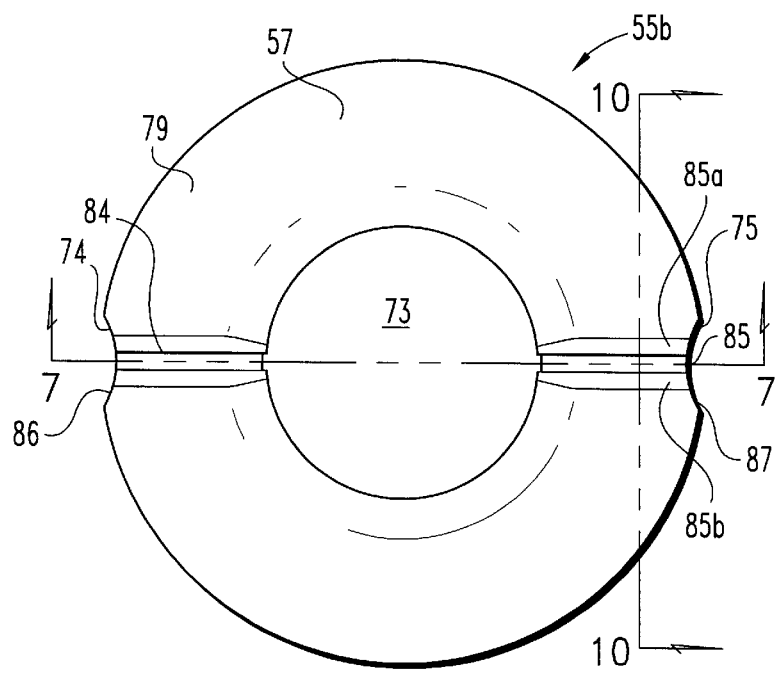
FIG. 8 is a top plan view of the FIG. 7 grommet.
Figure 9:
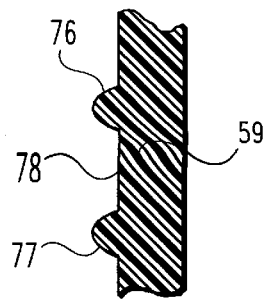
FIG. 9 is a partial, enlarged detail of annular sealing ribs which comprise part of the body portion of the FIG. 7 grommet.

With reference to FIGS. 4–6, grommet 55a is illustrated in greater detail. Grommet 55a includes, in addition to radial flange portion 56 and cylindrical body portion 58, a hollow, cylindrical interior 62 and optional radiused relief notches 63 and 64 in the flange portion. A pair of spaced-apart annular sealing ribs 60 and 61 are molded as part of the flange portion 56. A second pair of spaced-apart annular sealing ribs 65 and 66 are molded as part of the body portion 58. Body portion 58 has a centerline axis and flange portion 56 (except for ribs 60 and 61) is planar and is in a geometric plane which is perpendicular to the centerline axis of the body portion. Annular sealing ribs 60 and 61 (and likewise ribs 65 and 66) are spaced apart from one another by approximately 4.0–5.0 mm and extend, on a side, approximately 1.0–1.2 mm beyond the corresponding base surface. Ribs 65 and 66, which extend beyond outer surface 67, are the portions of grommet 55a which are compressed in order to establish a liquid-tight seal in clearance space 34 between the outer surface 35 of ignition coil 22 and the inner surface 36 of adapter tube 23. Compression of ribs 65 and 66 is due to the interference fit within clearance space 34. As would be understood, the use of additional ribs is contemplated. A minimum of two ribs provides a primary seal as well as a back up or secondary seal.

Flange portion 56 is substantially flat and of substantially uniform thickness, except for ribs 60 and 61 which extend beyond lower surface 69. It is to be noted that the defining upper and lower surfaces 68 and 69 of flange portion 56 are each substantially flat and substantially parallel to each other. An annular radiused bend 70 in cooperation with fillet radius 71 connects the flange portion 56 and the body portion 58. Ribs 60 and 61 are sealingly compressed by the tightening of bolts 48 which secures the head 47 to the cover 21.

With reference to FIGS. 7–12, grommet 55*b* is illustrated in greater detail. Grommet 55*b* is similar in many respects to grommet 55*a*, the primary difference being the addition (incorporation) of a venting feature into grommet 55*b* which is not part of grommet 55*a*. As such, grommet 55*a* is a non-vented grommet and grommet 55*b* is a vented grommet. Both grommet styles are suitable for use as an improvement and as a replacement to the two O-ring possibilities illustrated in FIG. 2.

Grommet 55*b* includes, in addition to radial flange portion 57 and cylindrical body portion 59, a hollow, cylindrical interior 73, optional radiused relief notches 74 and 75, and annular sealing ribs 76 and 77. Body portion 59 has a centerline axis and flange portion 57 (with the exception of sealing ribs 88 and 89) is planar and in a geometric plane which is perpendicular to the centerline axis of the body portion. Annular sealing ribs 76 and 77 are spaced apart by approximately 5.0 mm and extend, on a side, approximately 1.15 mm beyond the outer surface 78 of body portion 59. Ribs 76 and 77 are the portions of grommet 55*b* which are compressed in order to establish a liquid-tight seal in clearance space 34 between the outer surface 35 of ignition coil 22 and the inner surface 36 of adapter tube 23. Compression of ribs 76 and 77 is due to the interference fit within clearance space 34. As would be understood, the use of additional ribs is contemplated. A minimum of two ribs provides a primary seal as well as a back up or secondary seal.

Figure 10:
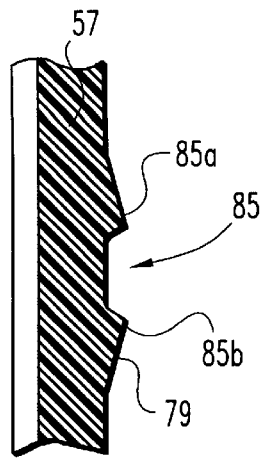
FIG. 10 is a partial, enlarged detail view of a vent channel which comprises part of the flange portion of the FIG. 7 grommet.

Flange portion 57 is defined by upper and lower surfaces 79 and 80 which are substantially flat and parallel to each other with the exception of the vent channels and sealing ribs which are disclosed hereinafter. An annular radiused bend 81 in cooperation with fillet radius 82 connects the flange portion 57 and the body portion 59. In order to incorporate a venting feature capability into grommet 55*b*, a pair of aligned, radial vent channels 84 and 85 are formed into the upper surface 79 of flange portion 57. Each vent channel 84 and 85 extends from the hollow interior 73 to the outer peripheral edge of portion 57 which coincides with the base or inner edge 86 and 87 of the corresponding optional relief notch, 74 and 75, respectively. Vent channel 84 extends to edge 86 of relief notch 74. Vent channel 85 extends to edge 87 of relief notch 75. In the FIG. 10 illustration, material has been added to the top surface of flange 57 in the form of raised or ramp portions 85*a* and 85*b* which are on opposite sides of vent channel 85. The same configuration is present with regard to vent channel 84. The added material provided by portions 85*a* and 85*b* is adjacent to vent channel 85 and concentrates the sealing load by pushing material into the vicinity of vent channel 85. This effectively fills in part of the vent channel void and adds to the amount of compression which is achieved. This helps to ensure a complete and liquid-tight seal.

Figure 11:
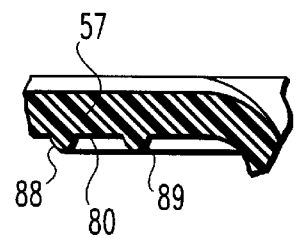
FIG. 11 is a partial, enlarged detail view of annular sealing ribs which comprise part of the flange portion of the FIG. 7 grommet.
Figure 12:
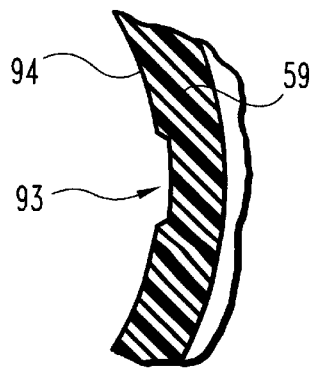
FIG. 12 is a partial, enlarged detail view of a vent channel which comprises part of the body portion of the FIG. 7 grommet.

The cross sectional (lateral) geometry of vent channel 85 is illustrated in FIG. 10. It is to be understood that the shape and geometry of vent channel 84 is virtually identical to that of vent channel 85. While two vent channels are illustrated, one vent channel as well as more than two vent channels could be used. The advantage of two or more is that you at least have one vent channel open if one becomes plugged. The channel depth below upper surface 79 is approximately 0.7 mm and the channel width is approximately 2.0 mm. As part of the present invention of FIG. 7, a pair of spaced-apart, annular sealing ribs 88 and 89 are molded into and are part of the lower surface 80 of flange portion 57. The details of sealing ribs 88 and 89 are illustrated in FIG. 11. Each rib 88 and 89, like ribs 76 and 77, has a curved or rounded shape in lateral cross section. The two ribs 88 and 89 are spaced apart from one another approximately 4.0 mm between their corresponding centerlines. The raised height of each rib 88 and 89 is approximately 1.0 mm.

In order for the venting capability to be complete, vent channels 92 and 93 are molded into the inner cylindrical surface 94 of body portion 59. Vent channels 92 and 93 are virtually identical in size, shape, and geometry to each other and the details of vent channel 93 are illustrated in lateral cross section in FIG. 12. Vent channel 93 is recessed (molded) down into the inner cylindrical surface 94 a dimension of approximately 0.15 mm and has a width dimension of approximately 2.0 mm. Each vent channel 92 and 93 extends the full length of body portion 59 and each one is in flow communication with its corresponding vent channel 84 and 85, respectively. This establishes a pair of continuous vent paths from the lower end of the body portion to the outer peripheral edge of the flange portion. The two vent channels 84 and 85 are positioned opposite to each other 180 degrees apart as are vent channels 92 and 93.

The lowermost edge 96 of body portion 59 includes a pair of relief notches 97 and 98. Relief notch 97 is aligned with and in flow communication with vent channel 92. Relief notch 98, which is 180 degrees apart from relief notch 97, is aligned with and in flow communication with vent channel 93. Relief notches 97 and 98 ensure that the vent channels 92 and 93 remain open. In a typical construction the ignition coil has a retainer ring around its cylindrical body. The lowermost edge 96 of body portion 59 rests against the retainer ring. Without relief notches 97 and 98, the vent channels 92 and 93 could be sealed closed by tight contact with the retainer ring.

When grommet 55*b* is installed where grommet 55 is illustrated in FIG. 3, ribs 76 and 77 are compressed slightly so as to establish a liquid-tight seal across clearance space 34. The vent channels 92 and 93 remain open as it is only ribs 76 and 77 which are sealingly compressed due to the interference fit.

Ribs 88 and 89 rest against the upper surface 41 of cover 21 and as the ignition coil is installed and the cap screws 48 tightened, head 47 draws down on flange portion 57, clamping flange portion 57 in position. Initially the two ribs 88 and 89 are compressed so as to establish a liquid-tight seal across interface 45 between the head portion of the ignition coil and the valve cover. As the two ribs 88 and 89 begin to be compressed, vent channels 84 and 85 are still open and thus venting to the atmosphere from the interior of adapter tube 23 is still possible. As the cap screws 48 are continued to be tightened, the flange portion is compressed to a greater degree and, accordingly, becomes dimensionally thinner. In time, and with the continued tightening of the cap screws, the flange portion is compressed to a degree that the two radial vent channels 84 and 85 close in such that the open, flow through interior of each channel disappears. The result is a fluid-tight interface between the ignition coil head and the cover by means of the flange portion of grommet 55b. A sealed chamber is created in the adapter tube and pressure build up is then possible as previously explained, due to the air trapped within this sealed volume and due to the elevated operating temperature which is generated.

When it is time to service the engine, one of the first steps to be performed is to gradually loosen the cap screws 48 on the ignition coil head. As this occurs, the distance between the head and the cover increases and the flange portion 57 is able to resiliently expand from its compressed state or gradually recover its original shape due to the elastomeric properties of the material used for grommet 55b. As the flange portion gradually expands, there will come a time that the two vent channels 84 and 85 start to reappear. As soon as a vent opening is created by way of channels 84 and 85, the air inside the tube has an escape path to the atmosphere. This allows the gradual release of the air pressure without the alarming "pop" sound.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A unitary sealing grommet for establishing a first liquid-tight interface between a first component and a second component and a second liquid-tight interface between said first component and a third component, said sealing grommet comprising:

a hollow main body portion having a substantially cylindrical shape and a longitudinal axis and being constructed and arranged with a pair of annular sealing ribs;

a substantially planar flange portion lying in a geometric plane which is substantially perpendicular to said longitudinal axis; and said main body portion being constructed and arranged to fit between said first component and said second component such that said pair of annular sealing ribs are compressed due to an interference fit and said planar flange portion being constructed and arranged to fit between said first component and said third component.

2. The sealing grommet of claim 1 wherein said first component is an ignition coil.

3. The sealing grommet of claim 2 wherein said second component is a spark plug adapter tube.

4. The sealing grommet of claim 3 wherein said third component is a valve cover.

5. The sealing grommet of claim 4 wherein said body portion defines a pair of oppositely disposed relief notches.

6. The sealing grommet of claim 5 wherein each of said annular sealing ribs has a rounded tip and wherein the two ribs are spaced apart from each other by approximately 5.0 mm.

7. The sealing grommet of claim 1 wherein said body portion defines a pair of oppositely disposed relief notches.

8. The sealing grommet of claim 1 wherein each of said annular sealing ribs has a rounded tip and wherein the two ribs are spaced apart from each other by approximately 5.0 mm.

9. In combination:

a portion of an engine including an ignition coil having a cylindrical body and a head at a first end of the cylindrical body, a cylindrical spark plug adapter tube and a valve cover, said ignition coil being attached to said valve cover; and a unitary sealing grommet including a hollow body portion having a substantially cylindrical shape and a longitudinal axis and being constructed and arranged with a pair of annular sealing ribs, and a substantially planar flange portion lying in a geometric plane which is substantially perpendicular to said longitudinal axis, said body portion being sealingly positioned between and compressed by said cylindrical body and said adapter tube, said flange portion being positioned between said head and said valve cover and being sealingly clamped in position by the attachment of the head of said ignition coil to said valve cover.

10. The combination of claim 9 wherein said body portion defines a pair of oppositely disposed relief notches.

11. The combination of claim 10 wherein each of said annular sealing ribs has a rounded tip and wherein the two ribs are spaced apart from each other by approximately 5.0 mm.

12. The combination of claim 9 wherein each of said annular sealing ribs has a rounded tip and wherein the two ribs are spaced apart from each other by approximately 5.0 mm.

13. A vented, unitary grommet for establishing a first liquid-tight interface between a first component and a second component and a second liquid-tight interface between said first component and a third component, said unitary grommet comprising:

a hollow main body portion having a substantially cylindrical shape and a longitudinal axis and being constructed and arranged with a pair of annular sealing ribs;

a substantially planar flange portion lying in a geometric plane which is substantially perpendicular to said longitudinal axis;

said main body portion being constructed and arranged to fit between said first component and said second component such that said pair of annular sealing ribs are compressed due to an interference fit and said planar flange portion being constructed and arranged to fit between said first component and said third component; and a vented capability being constructed and arranged in said unitary grommet by means of a first vent channel defined by an inside surface of said main body portion and by means of a second vent channel defined by an upper surface of said planar flange portion, said first and second vent channels being in flow communication with each other.

14. The grommet of claim 13 wherein said first component is an ignition coil.

15. The grommet of claim 14 wherein said second component is a spark plug adapter tube.

16. The grommet of claim 15 wherein said third component is a valve cover.

17. The grommet of claim 16 wherein said body portion defines a pair of oppositely disposed relief notches.

18. The grommet of claim 17 wherein each of said annular sealing ribs has a rounded tip and wherein the two ribs are spaced apart from each other by approximately 5.0 mm.

19. The grommet of claim 13 wherein said body portion defines a pair of oppositely disposed relief notches.

20. The grommet of claim 13 wherein each of said annular sealing ribs has a rounded tip and wherein the two ribs are spaced apart from each other by approximately 5.0 mm.

21. The unitary grommet of claim 13 which further includes a third vent channel defined by said inside surface and being circumferentially spaced apart from said first vent channel by approximately 180 degrees.

22. The unitary grommet of claim 21 which further includes a fourth vent channel defined by said upper surface and being radially spaced apart from said second vent channel by approximately 180 degrees.

23. In combination:
  a portion of an engine including an ignition coil having a cylindrical body and a head at a first end of the cylindrical body, a cylindrical spark plug adapter tube and a valve cover, said ignition coil being attached to said valve cover; and
  a vented, unitary grommet including a hollow main body portion having a substantially cylindrical shape and a longitudinal axis and being constructed and arranged with a pair of annular sealing ribs, a substantially planar flange portion lying in a geometric plane which is substantially perpendicular to said longitudinal axis, said main body portion being constructed and arranged to fit between said cylindrical body and said adapter tube such that said pair of annular sealing ribs are compressed due to an interference fit and said planar flange portion being constructed and arranged to fit between said head and said valve cover; and
  a vented capability being constructed and arranged in said unitary grommet by means of a first vent channel defined by an inside surface of said main body portion and by means of a second vent channel defined by an upper surface of said planar flange portion, said first and second vent channels being in flow communication with each other.

24. The combination of claim 23 wherein said body portion defines a pair of oppositely disposed relief notches.

25. The combination of claim 24 wherein each of said annular sealing ribs has a rounded tip and wherein the two ribs are spaced apart from each other by approximately 5.0 mm.

26. The combination of claim 23 wherein each of said annular sealing ribs has a rounded tip and wherein the two ribs are spaced apart from each other by approximately 5.0 mm.

27. A unitary sealing grommet for establishing a first liquid-tight interface between a first component and a second component and a second liquid-tight interface between said first component and a third component, said first component defining an opening, said second component being positioned in said opening and said third component being positioned in said opening and located between said first component and said second component, said sealing grommet comprising:
  a hollow main body portion having a substantially cylindrical shape and a longitudinal axis and being constructed and arranged with a pair of annular sealing ribs;
  a substantially planar flange portion lying in a geometric plane which is substantially perpendicular to said longitudinal axis; and
  said main body portion being constructed and arranged to fit between said second component and said third component such that said pair of annular sealing ribs are compressed due to an interference fit and said planar flange portion being constructed and arranged to fit between said first component and said second component.

28. The unitary sealing grommet of claim 27 wherein said body portion defines a pair of oppositely disposed relief notches.

29. The unitary sealing grommet of claim 27 wherein said third component is a spark plug adapter tube.

* * * * *